United States Patent
Hanna

(10) Patent No.: US 12,366,476 B2
(45) Date of Patent: Jul. 22, 2025

(54) AUTOMATED, OXYGEN-PURGED FOOD SERVICE AND INTEGRATED FOOD CONTAINERS

(71) Applicant: Nader George Hanna, Huntington Beach, CA (US)

(72) Inventor: Nader George Hanna, Huntington Beach, CA (US)

( * ) Notice: Subject to any disclaimer, the term of this patent is extended or adjusted under 35 U.S.C. 154(b) by 461 days.

(21) Appl. No.: 17/720,059

(22) Filed: Apr. 13, 2022

(65) Prior Publication Data
US 2022/0326065 A1 Oct. 13, 2022

Related U.S. Application Data

(60) Provisional application No. 63/174,213, filed on Apr. 13, 2021.

(51) Int. Cl.
| | |
|---|---|
| *G01G 19/414* | (2006.01) |
| *B65B 7/28* | (2006.01) |
| *B65B 57/06* | (2006.01) |
| *G01G 11/00* | (2006.01) |

(52) U.S. Cl.
CPC ....... *G01G 19/4144* (2013.01); *B65B 7/2878* (2013.01); *B65B 57/06* (2013.01); *G01G 11/00* (2013.01)

(58) Field of Classification Search
CPC .. G01G 19/4144; G01G 11/00; B65B 7/2878; B65B 57/06; B65B 25/001
USPC .......................................................... 177/3
See application file for complete search history.

(56) References Cited

U.S. PATENT DOCUMENTS

| | | | |
|---|---|---|---|
| 8,307,951 B2* | 11/2012 | Sus | A47F 10/06 |
| | | | 186/49 |
| 9,567,157 B2* | 2/2017 | Scudder | B65D 88/548 |
| 10,803,416 B2* | 10/2020 | Deemter | A47J 39/003 |
| 11,019,829 B2* | 6/2021 | Pfannenstiel | A23N 12/00 |
| 11,068,948 B1* | 7/2021 | Hanna | G06Q 30/0283 |
| 11,104,502 B2* | 8/2021 | Espinosa | A23L 3/01 |
| 11,776,351 B2* | 10/2023 | Yu | G07F 11/165 |
| | | | 221/150 A |
| 2020/0090114 A1* | 3/2020 | Conway | G07F 17/0064 |

FOREIGN PATENT DOCUMENTS

WO WO-2021051211 A1 * 3/2021 ............... A23L 3/01

* cited by examiner

*Primary Examiner* — Jacques M Saint Surin
(74) *Attorney, Agent, or Firm* — Michael L. Greenberg, Esq.; Greenberg & Lieberman, LLC

(57) ABSTRACT

An advanced food storing, dispensing, and packaging system, including the use of computing and communications technology to both monitor and improve quality of food. The storing and dispensing system can also integrate with better packaging. Such a system and technology is used to create a better way to acquire and control food quality, whether delivered or not, raw or cooked, that is fresher when monitored, whether it waits to be delivered for immediate consumption or is acquired raw or in bulk and stored in a home pantry. This technology can be further leveraged to enable patrons to access and transact a food purchase without waiting in a checkout line including food that is not required to be specially packaged in order to be recognized by video analytics.

10 Claims, 2 Drawing Sheets

AUTOMATED, OXYGEN-PURGED FOOD SERVICE AND INTEGRATED FOOD CONTAINERS

CONTINUITY

This application is a non-provisional patent application of provisional patent application number 63/174,213, filed on Apr. 13, 2021, and priority is claimed thereto.

FIELD OF THE PRESENT INVENTION

The present invention relates to the field of the food commerce, and more specifically relates to a new form of meal service station and food containers configured for the dispensing and storage of food for human consumption.

BACKGROUND OF THE PRESENT INVENTION

There are many inefficiencies in food service, from grocery to restaurants, in a world moving towards automation. For prepared food, labor costs are too high, food quality is too low, and delivery service lacks efficiency due to delivery drivers being often forced to wait for "cook to order" menu items to be completed by restaurants, or delivery drivers have arrived after the order has been made, where it can sit too long without any documentation as to the time it was placed in takeout containers. In addition, delivery drivers are faced with multiple orders to carry, causing food to further cool or lose freshness. Further still, in the case where the food is stored in temperature-controlled food wells for service, the food oxidizes in response to being exposed to ambient air.

If food were stored in a better way or it was minimally exposed to oxygen, and only for a short time while it was being dispensed, it can remain fresher and held longer whether it is stored in temperature-controlled food wells or at room temperature. Food is also subject to spoilage or other quality issues after it has been sold. A more advanced food storing, dispensing and packaging system, including the use of computing and communications technology can be employed to both monitor and improve quality of food.

Thus, there is a need for a storing and dispensing system which can also integrate with better packaging. Such a system and technology can be employed to create a better way to acquire and control food quality, whether delivered or not, raw or cooked, that is fresher and monitored, whether it waits to be delivered for immediate consumption or is acquired raw or in bulk and stored in a home pantry. This technology can be further leveraged to enable patrons to access and transact a food purchase without waiting in a checkout line including food that is not required to be specially packaged in order to be recognized by video analytics.

SUMMARY OF THE PRESENT INVENTION

The present invention is a solution which presents an improvement over the current standard for an automated checkout in a "grab and go" retailer and even presents solutions in packaging that will transform the food industry.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a food station configured to facilitate the safe and fresh storage of food products until distribution to containers, and ultimately consumption.

Figure 1:
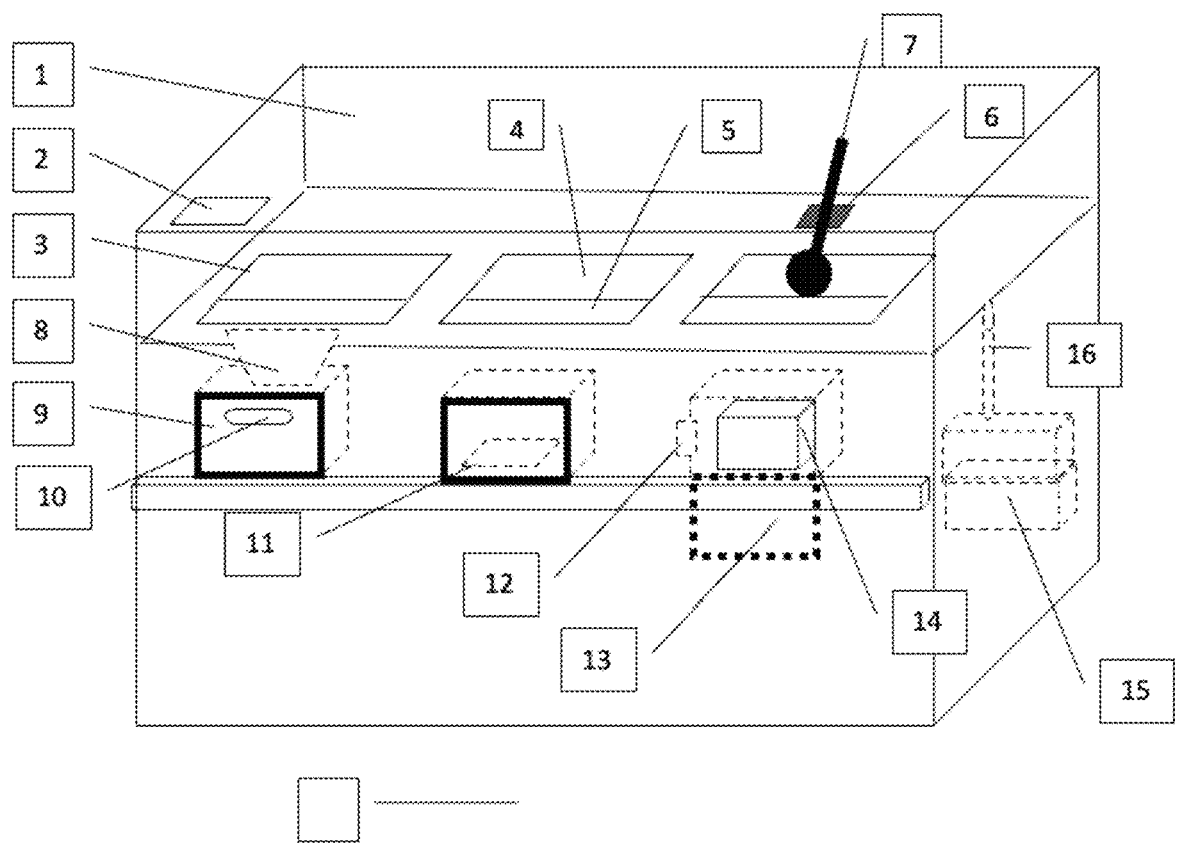
FIG. 1 exhibits a view of the full food station of the present invention as seen from the front side.

The food station as in FIG. 1 with its transparent top, enables customers to see the food. With a flexible material replacing a cutout in the transparent top (item 6 in FIG. 1) above the food well, a serving implement can be fit through the flexible material, enabling customers to manipulate a serving implement to grab food from the food well and push it over the top of the dispensing well. From there, the food drops into the dispensing chamber where a food package is placed to capture the falling food (item 14 in FIG. 1).

For actual service, the customer places their phone on the mobile computing device holder which contains NFC or other computing technology (item 2 in FIG. 1) which is in close proximity, and associated with, a respective food well in order to 1. Identify themselves as the paying customer and 2. Receive data associated with the respective food item, to the screen of the customer's mobile computing device, such as food description, price per weight, amount dispensed in real time as a running total of both weight and price, with each cycle of the serving implement, calories dispensed in real time, etc. as a running total with multiple serving cycles, as the serving implement is used for multiple scoops, as well as any other relevant data. The communications device can be any technology, such as NFC or any other computing technology communicatively connected to the food station, including the load cells beneath the dispensing chamber, in order to acquire the aforementioned data.

The station can be restricted in operation in the following way: The serving implement and/or the sliding door in front of the dispensing chamber could be locked, or rendered inoperable, with the dependency of one or more the following: a recognized customer placing their phone on the mobile computing device holder, the sliding door is sensed as being open without containing a food package, the food well is sensed to be empty be means of a sensor, or any other condition that prevents safe, secure operation of the food station. As a routine, the customer would first place their mobile computing device on the mobile computing device holder, this would enable the serving implement and/or sliding door to be operable, the customer would then open the sliding door, then they would place a food package into the dispensing chamber, the customer would then grab the serving implement to scoop the food above the drop well, the customer would then witness how much food they were dispensing by weight and price on the screen of their mobile computing device. Once they customer has determined they are satisfied with the portion of food dispensed, the would remove the food package and close the sliding door. One note is that the spoon could be configured inoperable unless the sliding door is closed, to prevent tampering with the weight of the food package above the load cell.

One means of purging the station of oxygen could include a gas concentrator that would be positioned within the food station with a controlled flow of such an optimal gas, such as nitrogen, or some other lighter-than-air-gas (LTAG) as to enable oxygen to be continually purged out via the dispensing chambers, being heavier than the LTAG.

Figure 2:
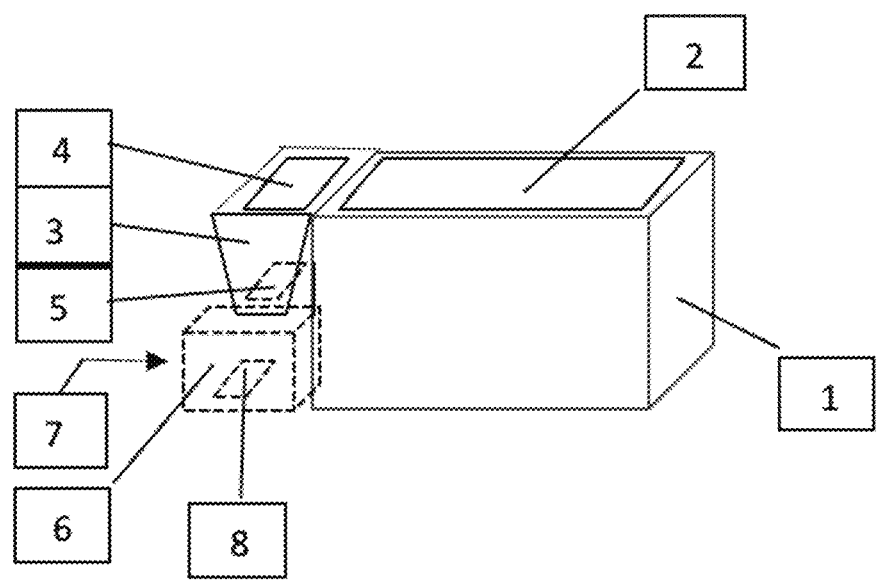
FIG. 2 depicts a view of the food well, drop well, dispensing chamber and load cell of the apparatus of the present invention.

As shown in FIG. 1, the components of the full food station of the present invention are as follows:
 1. Depiction of the top of transparent food station, with food wells seen within
 2. Mobile computing device holder and NFC tag or other communications component(s) for interaction with customer's mobile device imparting food type, costs, calories, etc. (only depicted for one of three food wells.)
 3. Two-sectioned food pan including food well and drop well
 4. Food well, wherein food is stored and kept at temperature
 5. Drop well where food is pushed above using serving implement
 6. Flexible material replacing cutout in transparent food well enclosure to enable serving implement use (only depicted for one of three food wells.)
 7. Serving implement to move food from food well over drop well (only depicted for one of three food wells.)
 8. Hidden drop well funnel, wherein food is funneled into food packaging
 9. Customer facing sliding door to dispensing chamber
 10. Sliding door handle for customer access to dispensing chamber (only depicted for one of three food wells.)
 11. Load cell that weighs food in dispensing chamber (only depicted for one of three sliding doors.)
 12. Sensor that determines if sliding door is open or shut (only depicted for one of three dispensing chambers.)
 13. Sliding door slid down and hidden in station
 14. Food packaging container positioned within dispensing chamber
 15. LTAG Concentrator and Flow Meter
 16. LTAG supply conduit to enclosed food pans The components of the food well, drop well, dispensing chamber, and load cell of the present invention, as depicted in FIG. 2, are as follows:
 1. Food well exterior surface
 2. Food well interior
 3. Drop well exterior surface.
 4. Drop well top opening.
 5. Drop well bottom opening.
 6. Dispensing chamber (no takeout food container depicted)
 7. Load Cell at base of dispensing chamber
 8. Direction of insertion of takeout food container from front of dispensing chamber Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. An enclosed, automated food storing and dispensing station, (hereafter referred to as "food station") configured to be purged of oxygen, wherein customer-dispensed portions of prepared, bulk or raw food are charged by weight; and
   wherein temperature-controlled food wells contained within are coupled with a conduit with a first opening at the same height or higher than the top of the food well, and at least above the food contained within the coupled food well, and a second opening at the base of said conduit.

2. An enclosed, automated food storing and dispensing station, (hereafter referred to as "food station") configured to be purged of oxygen, wherein customer-dispensed portions of prepared, bulk or raw food are charged by weight; and
   containing a transparent cover positioned above the food wells and coupled drop wells conduits, configured with a flexible members that replace a cut out section of the transparent cover above each food and conduit respectively, as to enable a serving implement to be positioned from the exterior of the food station to the interior, through the flexible member, in order to prevent the passage of air between the exterior and interior of the food station.

3. An enclosed, automated food storing and dispensing station, (hereafter referred to as "food station") configured to be purged of oxygen, wherein customer-dispensed portions of prepared, bulk or raw food are charged by weight; and
   containing a patron-facing dispensing chamber located below the bottom opening of the conduit accessible for entry through a sliding door.

4. The dispensing chamber, as in claim 3, containing a load cell at its base so the food dispensed into the takeout is configured to be continually weighed as food is dispensed, as to apprise the patron of the running cost and weight of food.

5. The dispensing chamber as in claim 3, containing a sensor at its back wall to detect when a takeout food container has been inserted or locks the food serving implement into an unusable position.

6. The dispensing chamber, as in claim 3, containing a sealing mechanism for food packaging, wherein, once food is dispensed into a food packaging container, the sealing mechanism is engaged to seal the container, such as heating elements employed to melt dimples contained within the food packaging.

7. The dispensing chamber, as in claim 3, containing a code reader, such as UPC, to acquire data from food packaging, as in a bar code technology associated with the packaging to track data relating to the order.

8. The dispensing chamber as in claim 7, wherein said food packaging containers are configured with dimples for heat sealing or code reader such as UPC codes.

9. The dispensing chamber as in claim 7, wherein said food packaging containers are equipped with unique codes to interact with the station via the dispensing chamber.

10. The dispensing chamber as in claim 7, wherein said food packaging containers a metal component such as a disc, capable of being heated by means of induction, in order to be continually heated by an induction cooking unit during travel.

\* \* \* \* \*